United States Patent
Winkler

(10) Patent No.: US 7,275,739 B2
(45) Date of Patent: Oct. 2, 2007

(54) SUPPORT BEARING

(75) Inventor: Gerold Winkler, Birkenau (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 11/016,704

(22) Filed: Dec. 17, 2004

(65) Prior Publication Data
US 2005/0236752 A1 Oct. 27, 2005

(30) Foreign Application Priority Data
Dec. 18, 2003 (DE) ................. 103 59 639

(51) Int. Cl.
F16F 5/00 (2006.01)
F16F 9/00 (2006.01)
F16F 13/00 (2006.01)
F16F 15/00 (2006.01)

(52) U.S. Cl. ................................ 267/140.14
(58) Field of Classification Search ........... 267/140.11, 267/140.13, 140.14, 140.95
See application file for complete search history.

(56) References Cited

U.S. PATENT DOCUMENTS

| 4,836,515 A * | 6/1989 | Franz et al. ................. 267/219 |
| 4,877,225 A * | 10/1989 | Noguchi et al. ....... 267/140.14 |
| 5,060,959 A * | 10/1991 | Davis et al. .............. 280/5.514 |
| 5,601,280 A * | 2/1997 | Nagaya et al. ......... 267/140.14 |
| 6,276,494 B1* | 8/2001 | Ward et al. ............. 188/1.11 W |
| 2003/0030203 A1* | 2/2003 | Nemoto .................. 267/140.14 |
| 2004/0040798 A1* | 3/2004 | Fujita et al. ................. 188/156 |
| 2004/0173955 A1* | 9/2004 | Groth et al. ........... 267/140.13 |

OTHER PUBLICATIONS

Picture of mushroom found on google.com on Apr. 12, 2006.*

* cited by examiner

Primary Examiner—Devon Kramer
(74) Attorney, Agent, or Firm—Harness, Dickey & Pierce, P.L.C.

(57) ABSTRACT

The invention relates to a support bearing (10) with a damping channel linking a working chamber (11) and a compensation chamber (12), said damping channel being provided with a damping channel orifice (14) that can be opened and closed with a plug (15). Until now, high pressing forces were required to keep the damping channel orifice (14) closed with the plug (15) at peak pressures. The object of the invention is to reduce markedly the pressing forces with which the plug (15) must be pressed against the damping channel orifice (14) at peak pressures. In the support bearing (10) of the invention, the plug (15) can be pressed against the damping channel orifice (14) from the direction of the working chamber (11).

11 Claims, 2 Drawing Sheets

SUPPORT BEARING

The invention relates to a support bearing with a damping channel linking a working chamber and a compensation chamber and being provided with a damping channel orifice that can be opened and closed with a plug.

Many possible ways of closing the orifice of the damping channel are known from the prior art. For example, it is possible for the damping channel orifice to be closed with a steel spring and opened by applying negative pressure. In this case, the plug is pressed against the orifice from the side of the compensation chamber. In the future, however, negative pressures will no longer be available in a motor vehicle. For this reason, to close and open the damping channel orifice, an electric motor pressing the plug against the damping channel orifice from the side of the compensation chamber can be used. Because the pressure in the working chamber can be very high, namely peaking at about 5 bar, however, gears are needed that are capable of pressing the plug against the orifice at such peak pressures. These gears, however, present problems in terms of heat exchange and contamination, problems that can cause defective operation of the support bearing.

The object of the invention therefore is to reduce greatly the pressing forces with which the plug must be pressed against the damping channel orifice at such peak pressures.

According to the invention, the problem is solved by use of a support bearing of the afore-indicated kind in which, according to the invention, the plug can be pressed against the damping channel orifice from the direction of the working chamber. By this solution of the problem, the plug is pressed against the damping channel orifice at the pressure prevailing in the working chamber. Consequently, a motor actuating the plug can have much smaller dimensions than before and still keep the damping channel orifice closed even at peak pressures. Moreover, it is possible to omit the said gear altogether or also to reduce its dimensions. By omitting the gear, it will in the future be possible to prevent malfunctioning of the support bearing to a great extent.

Because electric energy is available in a motor vehicle when the vehicle is operating, the plug can be actuated by an electric motor.

In a preferred embodiment of the invention, the plug can be actuated by a direct-current motor. Direct-current motors are known to be inexpensive components so that their use contributes to the cost reduction of the support bearing.

In a further development of the invention, the direct-current motor can be equipped with a Hall transmitter. The Hall transmitter takes over the function of path scanning to determine the position of the plug.

In another embodiment, it is also possible, however, to equip the direct-current motor with an inductive displacement sensor capable of taking over the path scanning function.

In an especially elegant embodiment, the plug can be actuated by a stepping motor. With the stepping motor, the position of the plug can be determined without the need for additional components.

Advantageously, the plug is provided with a drive spindle. The plug and the drive spindle can constitute a single piece thus reducing the fabrication costs of the support bearing.

When the plug and the drive spindle constitute a single piece, they can be made inexpensively of a plastic material In another embodiment, however, it is also possible for the plug and the drive spindle to constitute two separate parts, in which case the plug can be screwed onto the drive spindle. Advantageously, the spindle can then be provided with an outer thread and the plug with an inner one.

The plug can be in the shape of a cone the tip of which can be inserted into the damping channel orifice. In this arrangement, the plug is centered in the damping channel orifice.

In another embodiment, it is also possible for the plug to be mushroom-shaped. This shape of the plug provides the damping channel with particularly favorable flow characteristics during operation.

In another inexpensive variant of this embodiment, the plug can have the shape of a plate, preferably a round plate.

The plug can advantageously be made of a metal and/or of a plastic material.

When the damping channel is located in the center of a dividing wall disposed between the working chamber and the compensation chamber, vibrations of the highest amplitude can be transmitted.

In the following, exemplary embodiments will be explained in greater detail by reference to the attached drawings, in which.

Figure 1:
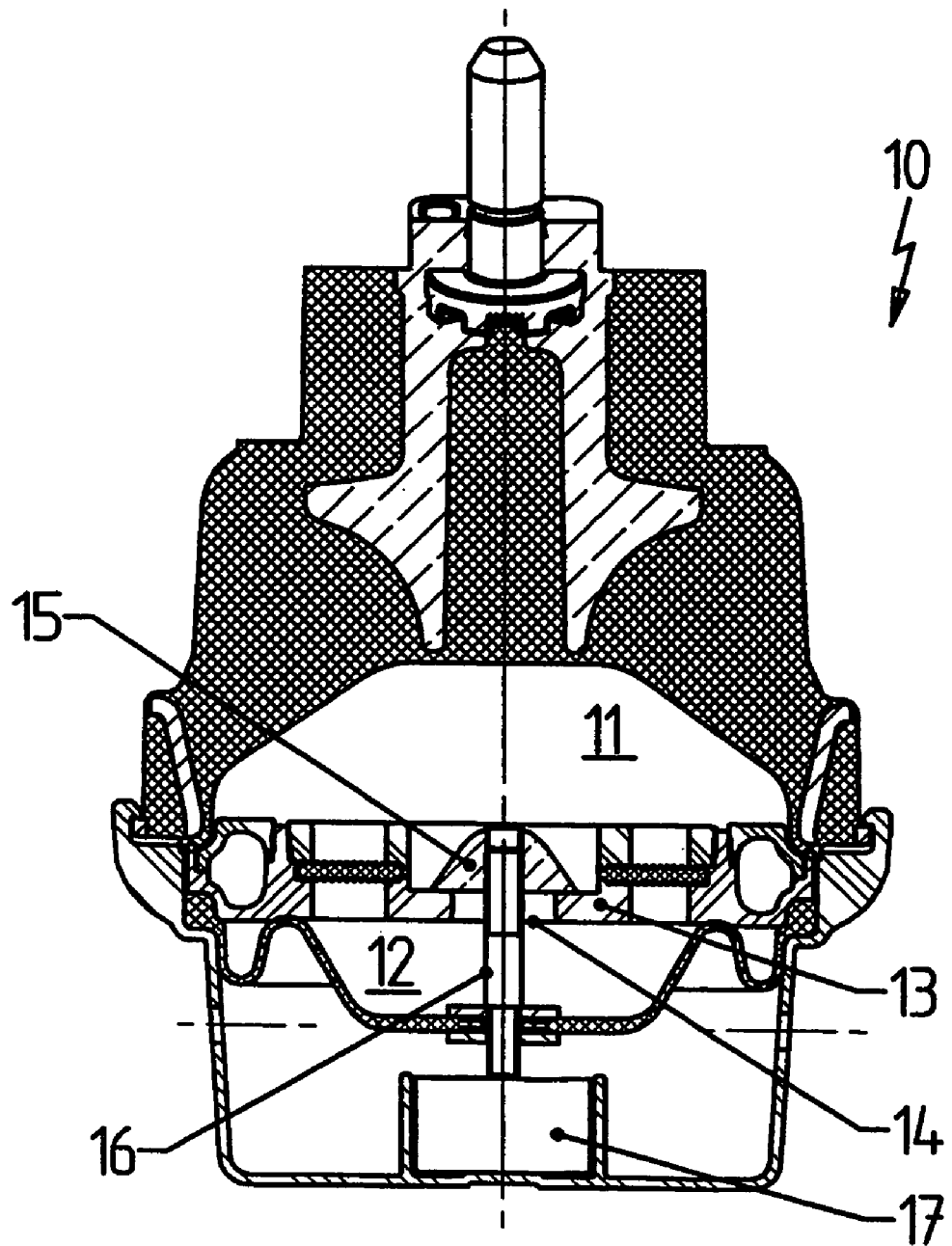
FIG. 1 shows a cross-sectional view of the support bearing of the invention.

FIG. 1 shows a support bearing 10 with a working chamber 11 and a compensation chamber 12. Working chamber 11 and compensation chamber 12 are separated from each other by a dividing wall 13. In dividing wall 13 is located a damping channel orifice 14. Damping channel orifice 14 can be opened and closed with a plug 15. To close damping channel orifice 14, plug 15 is pressed against damping channel orifice 14 from the direction of working chamber 11. Plug 15 is provided with a drive spindle 16. On drive spindle 16 is disposed an electric motor 17 intended to actuate plug 15.

Electric motor 17 can be a direct-current motor or a stepping motor. When electric motor 17 is a direct-current motor, said motor can be equipped with a Hall transmitter or an inductive displacement sensor for path scanning.

Figure 2:
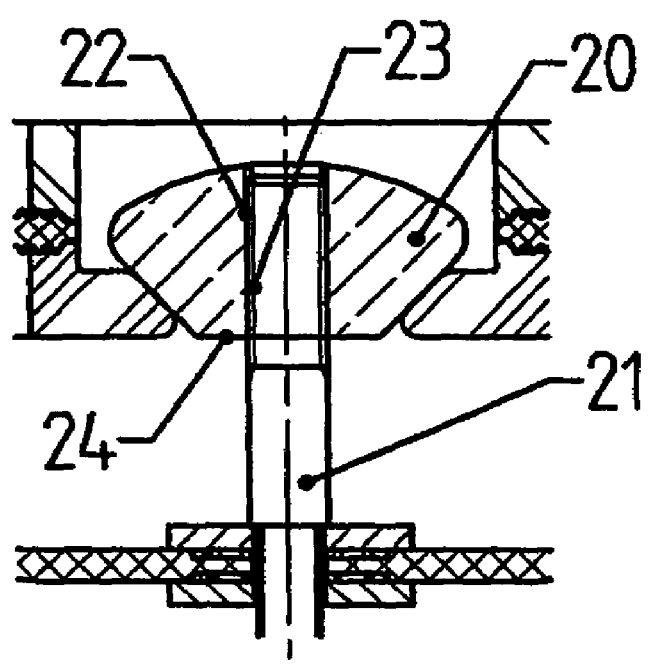
FIG. 2 shows a cross-sectional view of a plug.

Plug 15 and drive spindle 16 can consist of a single piece of plastic material. It is also possible, however, for a plug 20 and a drive spindle 21 to form a single piece (see FIG. 2). In this case, plug 20 can then have an inner thread 22 and drive spindle 21 an outer thread 23 so that plug 20 can be screwed onto drive spindle 21.

Plug 15 has the shape of a mushroom. During the operation of the damping channel, the mushroom shape provides especially favorable flow characteristics.

Plug 20, on the other hand, has the shape of a cone. The tip of the cone can be inserted into a damping channel orifice 24, plug 20 being centered in orifice 24. In principle, the plug can have other advantageous shapes, for example that of a round plate.

Damping channel orifice 14 is located in the middle of dividing wall 13. In this manner, vibrations of the highest amplitude can be transmitted.

LIST OF REFERENCE NUMERALS 10 support bearing
11 working chamber
12 compensation chamber
13 dividing wall
14 damping channel orifice
15 plug
16 drive spindle
17 electric motor
20 plug 21 drive spindle
22 inner thread
23 outer thread
24 damping channel orifice

What is claimed is:

1. A support bearing comprising:
   a working chamber;
   a compensation chamber; and
   a dividing wall separating said working chamber and said compensation chamber, said dividing wall having a damping channel that links said working chamber and said compensation chamber; said damping channel being provided with a damping channel orifice that can be opened and closed with a mushroom-shaped plug, said mushroom shaped plug being formed of a plug portion and a spindle portion, said plug portion being generally hemispherical in shape such that a planar bottom surface of said plug portion may directly contact a corresponding planar surface formed on said dividing wall;
   wherein said bottom surface of said plug portion is pressed against the dividing wall and damping channel orifice from the direction of the working chamber.

2. The support bearing according to claim 1, wherein said plug is actuated with an electric motor.

3. The support bearing according to claim 2, wherein said electric motor is a direct-current motor.

4. The support bearing according to claim 2, wherein said plug is actuated with a stepping motor.

5. The support bearing according to claim 2, wherein said plug and a drive spindle of said electric motor form a single unit.

6. The support bearing according to claim 5, wherein said plug and said drive spindle are comprised of a plastic material.

7. The support bearing according to claim 5, wherein said plug can be screwed onto said drive spindle.

8. The support bearing according to claim 1, wherein said plug comprises a metal and/or a plastic material.

9. The support bearing according to claim 1, wherein said damping channel is disposed in a middle portion of a dividing wall that is located between said working chamber and said compensation chamber.

10. A support bearing comprising:
    a working chamber;
    a compensation chamber; and
    a dividing wall including a damping channel that separates said working chamber and said compensation chamber, said damping channel linking said working chamber and said compensation chamber; said damping channel being provided with a damping channel orifice that can be opened and closed with a plug, said plug being formed of a plug portion and a spindle portion, said plug portion being generally hemispherical in shape such that a planar bottom surface of said plug portion may directly contact a corresponding planar surface formed on said dividing wall;
    wherein said plug is pressed against the damping channel orifice from the direction of the working chamber, wherein said plug is actuated with a direct current electric motor wherein said direct-current motor is equipped with a Hall transmitter.

11. A support bearing comprising:
    a working chamber;
    a compensation chamber; and
    a dividing wall including a damping channel that separates said working chamber and said compensation chamber, said damping channel linking said working chamber and said compensation chamber; said damping channel being provided with a damping channel orifice that can be opened and closed with a plug, said plug being formed of a plug portion and a spindle portion, said plug portion being generally hemispherical in shape such that a planar bottom surface of said plug portion may directly contact a corresponding planar surface formed on said dividing wall;
    wherein said plug is pressed against the damping channel orifice from the direction of the working chamber, wherein said plug is actuated with a direct current electric motor wherein said direct-current motor is equipped with an inductive displacement scanner.

* * * * *